United States Patent [19]

Kaspari

[11] Patent Number: 5,896,473
[45] Date of Patent: *Apr. 20, 1999

[54] RE-CONFIGURABLE BUS BACK-PLANE SYSTEM

[75] Inventor: Daniel K. Kaspari, Cedar Rapids, Iowa

[73] Assignee: Rockwell International Corporation, Costa Mesa, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/672,492

[22] Filed: Jun. 26, 1996

[51] Int. Cl.$^6$ .................................. G02B 6/28; H01R 9/09
[52] U.S. Cl. .......................... 385/24; 385/53; 385/88; 385/89; 385/139; 439/61; 439/65; 439/577
[58] Field of Search ........................ 439/61, 65, 439, 439/485, 738, 577; 361/788, 796; 385/24, 49, 53, 88, 89, 139

[56] References Cited

U.S. PATENT DOCUMENTS

| | | | |
|---|---|---|---|
| 4,678,264 | 7/1987 | Bowen et al. | 385/89 X |
| 4,797,123 | 1/1989 | Weber | 439/717 |
| 5,207,613 | 5/1993 | Ferchau et al. | 454/184 |
| 5,218,654 | 6/1993 | Sauter | 385/24 |
| 5,337,388 | 8/1994 | Jacobowitz et al. | 385/76 |
| 5,396,573 | 3/1995 | Ecker et al. | 385/88 |
| 5,407,362 | 4/1995 | Carstens et al. | 439/361 |
| 5,430,615 | 7/1995 | Keeth et al. | 439/61 |
| 5,472,347 | 12/1995 | Nordenstrom et al. | 439/61 |
| 5,546,282 | 8/1996 | Hill et al. | 439/61 |
| 5,547,386 | 8/1996 | Fredberg | 439/61 |

Primary Examiner—Brian Healy
Attorney, Agent, or Firm—Kyle Eppele; James P. O'Shaughnessy

[57] ABSTRACT

A system for coupling circuit card assemblies or modules that comprise a given device, that accommodates manufacturing and design differences in connector configurations. A common back-plane having one or more signal buses is joined to the circuit card assemblies or modules by means of unique interface backplanes configured to engage the common backplane connectors and the connectors on the circuit card assemblies. The system is specifically described in conjunction with electrical and optical bus interfaces.

4 Claims, 4 Drawing Sheets

RE-CONFIGURABLE BUS BACK-PLANE SYSTEM

FIELD OF INVENTION

The present invention relates generally to electronic devices, and more particularly to such devices having a plurality of circuit card assemblies or modules comprising its architecture and most particularly with electronic devices having a plurality of circuit card assemblies coupled mechanically, electrically and optically with each other or with a common back-plane.

BACKGROUND OF THE INVENTION

The rapid rate of evolution of information systems is often constrained at the point of fielded units, by the investment in previous generations of equipment. An additional complicating factor is the lack of uniformity among various vendors with respect to such items as specific functionality, size and appearance of their various products, including sub-assemblies. In spite of the efforts of industry and trade associations, a wide variety of configurations typically exist for any given functionality desired to be incorporated into a new or existing information system.

One attempt at minimizing the effect of such variation among products, manufacturers, and technology evolution was the modularization architecture implemented in numerous information systems. By limiting or placing certain functionality of any given system in a subassembly with a preferred interface scheme, evolution as well as technological advantage can be gained over proprietary systems of unique design.

In a perfect world, strict adherence to such design criteria would eliminate all compatibility problems for a given type signal to be transmitted between a back-plane containing a communication bus and a given sub-assembly. However, in addition to the challenges of maintaining configuration control over the interface functionality between various sub-assemblies with respect to a given communication bus in the real world, more than one bus is often coupled to each sub-assembly thereby further complicating interface issues. Additionally, manufacturers not knowing of specific interfaces, or unwilling to abide by such design limitations, can sometimes gain a commanding market position with respect to their product.

Accordingly, a system for reconfiguring the interface between the back-plane having one or more bus structures and each sub-assembly or module is needed to provide greater flexibility in fielding newly designed components.

SUMMARY OF THE INVENTION

The present invention comprises a system for coupling one or more bus structures to one or more sub-assemblies, such as circuit card assemblies or modules, in an information system via the use of an application specific interface board disposed between the individual sub-assembly and a back-plane containing the bus structures. The application specific interface board may take a variety of configurations in order to accommodate various connector dimensions, as well as a plurality of bus structures as dictated by the specific design, including but not limited to electrical and optical bus structures.

In one embodiment of the present invention a standard electronic module (SEM) designed to satisfy various military standards incorporates the teachings of the present invention. A plurality of SEMs in conjunction with a common backplane are fitted within a rack assembly, thereby yielding a device having specified functionality. The common back-plane supports an electrical bus and a fiber optic bus for coupling to one or more of the plurality of SEMs. Disposed between the common back-plane and each SEM is an application specific interface back-plane that electrically and optically couples one or more bus to a SEM. In this manner manufacturing tolerances or varying configurations that satisfy the same standards can be accommodated within a single unit.

It is an object of the present invention to provide a system for coupling sub-assemblies or modules of varying connector configurations to common bus structures.

It is yet another object of the present invention to provide a method of optimizing various embodiments of a specified functionality, whether or not such embodiment was designed to a common form and fit.

It is a feature of the present invention to utilize application specific interface back-planes to provide for varying connector configurations between two items.

It is yet another feature of the present invention to utilize a modular fiber optic back-plane.

It is an advantage of the present invention that the system for coupling sub-assemblies to a common back-plane can be retro-fitted to numerous fielded units.

It is another advantage of the present invention that a simplistic, relatively inexpensive solution is provided for enhancing subsequent generations of similar device sub-assemblies.

These and other objects, features and advantages are disclosed and claimed in the specification, figures, and claims of the present application.

DETAILED DESCRIPTION OF THE PREFERRED EMBODIMENTS

Figure 1:
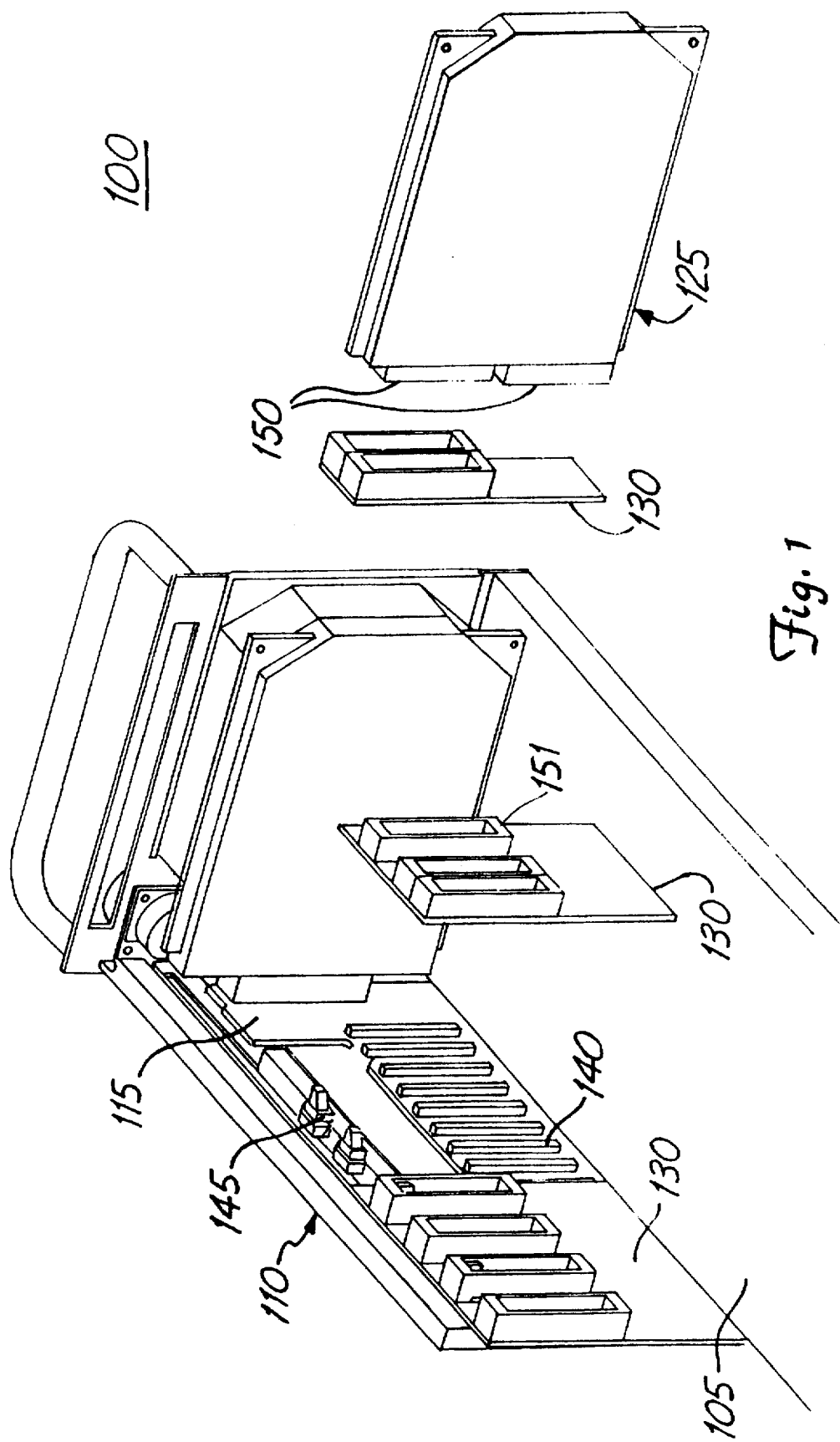
FIG. 1 illustrates an exploded perspective view of an information system encompassing the teachings of the present invention.

Referring now to the drawings, wherein like items are referenced as such throughout, FIG. 1 illustrates an exploded perspective view of an information system 100 incorporating the teachings of the present invention. As shown, information system 100 represents a transceiver constructed in accordance with general avionic or ruggedized specifications although it is understood that the advantages of the present invention would be equally applicable to a broad range of equipment, especially any such equipment that incorporates a rack style architecture.

Specifically, system 100 is comprised of a rack 105 which provides physical configuration parameters for the unit 105, as well as much of the ruggedization feature. Although depicted as a square rack of a given length, it is understood that the physical shape and size of the rack 105 is not in a limiting factor of the present invention. A fiber optic back-plane (detailed in FIG. 2) having a substrate 110, provides support, rigid as shown, to a common electrical backplane 115. The electrical and fiber optic backplanes may be thought of as busbars in as much as via coupling to SEMs 125, a common connection can be made between any of several sources to any of several destinations. With regard to the electrical backplane 115, a plurality of couplers 140 are fixed in predetermined locations and of a given configura-

3 tion. Similarly, a plurality of couplers 145 are located on the fiber-optic backplane. Application specific interface backplanes 130 are disposed between the various couplers 140, 145 and are designed to engage such couplers physically so as to promote signal flow. Additionally, couplers 150 located on the SEMs 125 are mated with matching couplers 151 on the application-specific interface backplane so as to support a wide divergence of unique couplers and their respective locations on each of the backplanes and SEMs.

Figure 2:
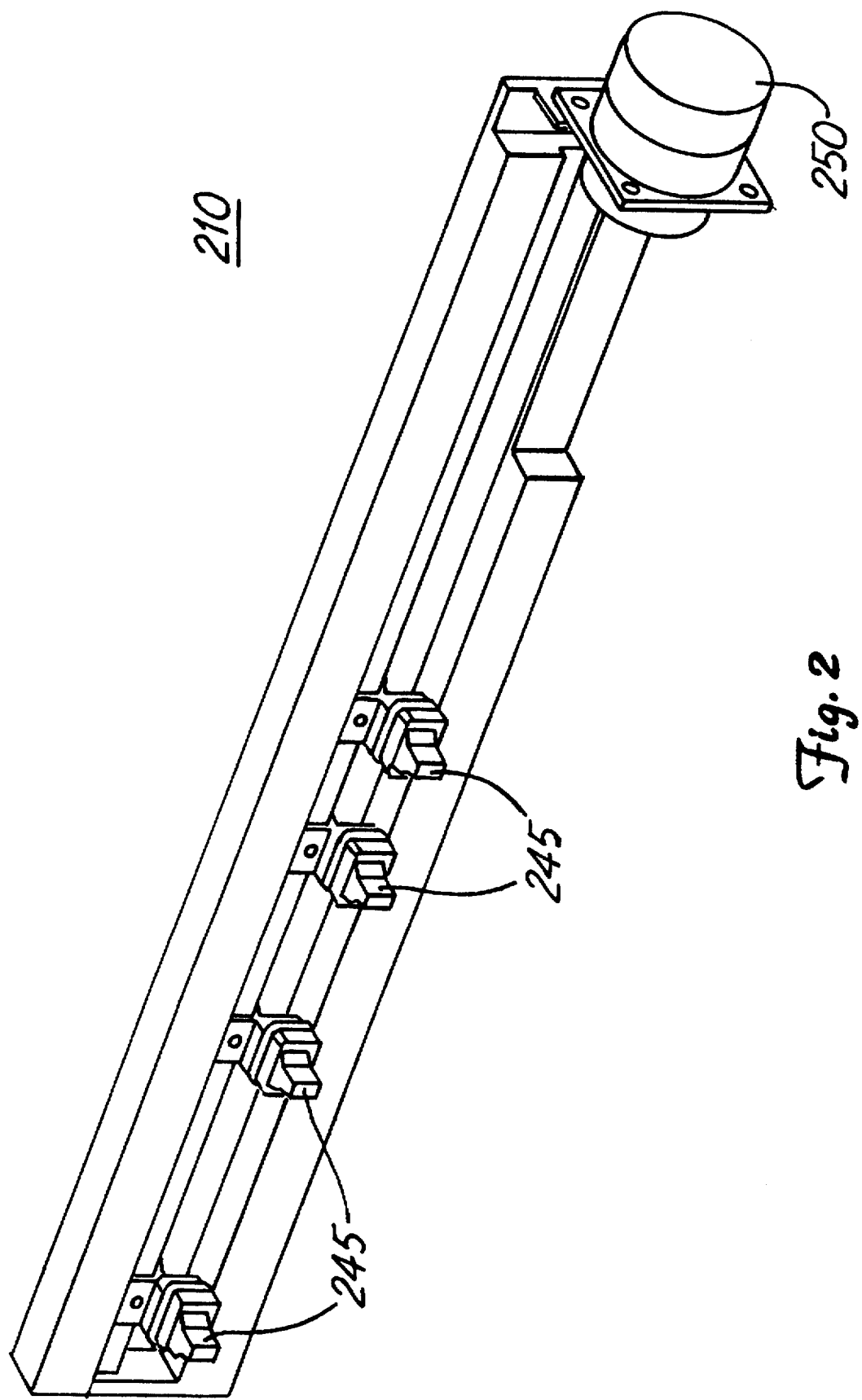
FIG. 2 illustrates a perspective view of a modular fiber-optic backplane, as implemented on the system of FIG. 1.

FIG. 2 illustrates the modular fiber optic backplane of FIG. 1 in greater detail. As shown the modular fiber optic backplane 210 has couplers 245 for engaging and communicating with SEMs, via application specific interface backplanes (see FIG. 1). A rack interface fiber optic connector 250 is provided for coupling the fiber optic backplane 210 to other devices, not shown. It is understood that the entire assembly 210 could be replaced for a given configuration of sub-assemblies without incurring the additional expense of replacing unaffected components.

The modular fiber optic backplane 210 is a self contained component that attaches to a rack enclosure through an access cover, depicted in FIG. 1 at the rear of the rack 105. The modular fiber optic backplane also functions as a mounting structure for other components within the rack such as the application specific interface backplanes 130 of FIG. 1. It should also be noted that the modular fiber optic backplane 210 can be easily customized for each unique rack configuration by simply positioning the fiber optic couplers 245 in such locations and in such numbers as warranted by the rack system design.

Figure 3:
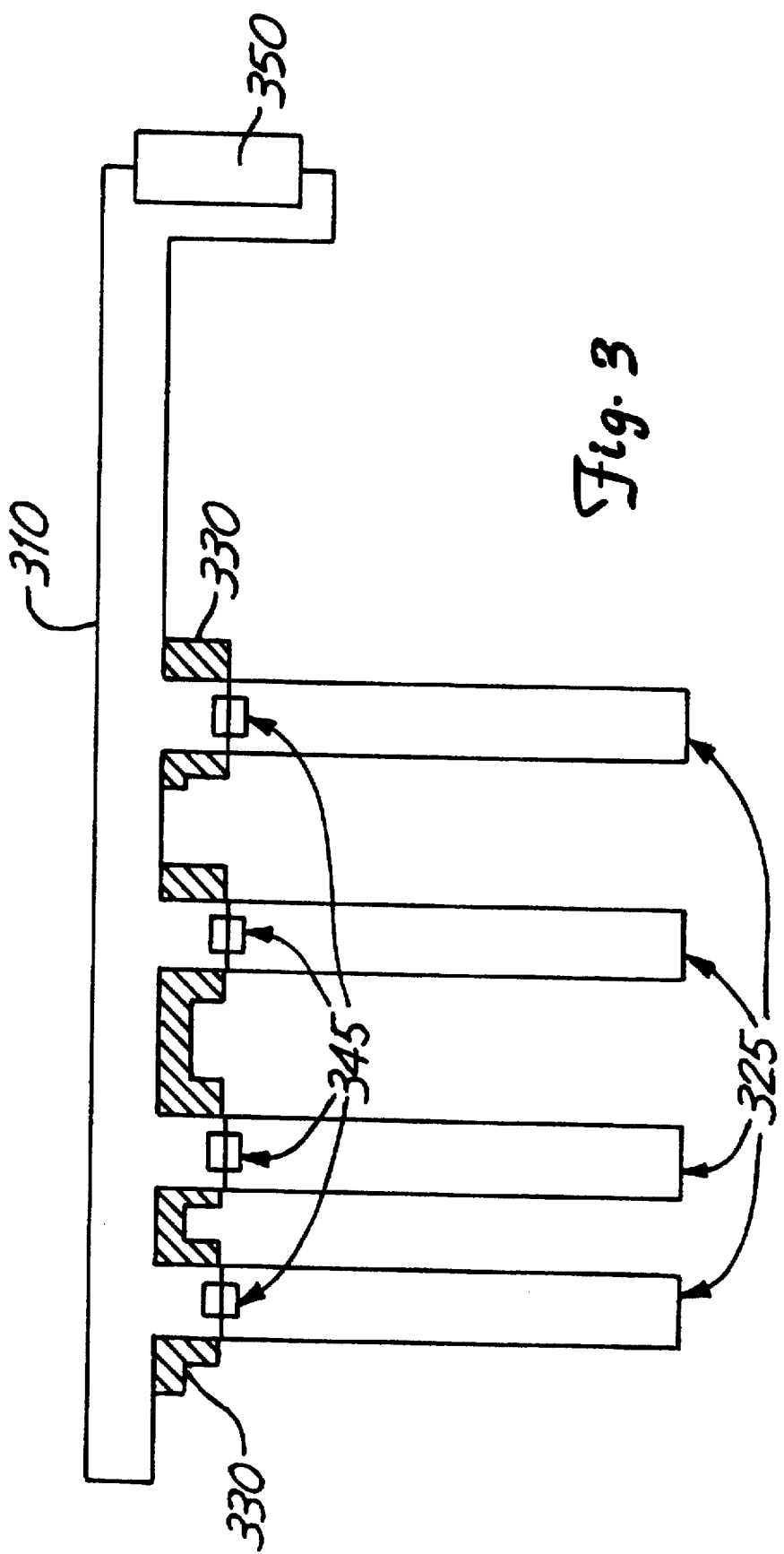
FIG. 3 illustrates a top view of a modular fiber-optic backplane, shown in FIG. 2.

FIG. 3 illustrates the modular fiber optic backplane of FIG. 2 in a top view with SEMs 325 coupled to the modular fiber optic backplane 310, via application specific interface backplanes 330. A standard circular rack interface connector 350 is utilized to couple the rack to other components since regardless of how many SEMs were coupled to the backplane 310, the fiber count at the rack interface would be constant.

FIGS. 2 and 3 illustrate the advantages of the present invention with respect to fiber optic signals in that the modular construction allows for the simple replacement of fiber optic backplanes if system requirements dictate a different quantity along with the positioning of couplers along on a standard length backplane, thereby utilizing a minimum number of fiber terminations. Since all fiber optic components would be contained within a single assembly, significant advantages could be realized during assembly with respect to unintentional damage or improper coupling. Additionally, the rigidity and packaging of the backplane would result in improved reliability and lowered damage during subsequent servicing or retrofitting of the fielded unit.

Figure 4:
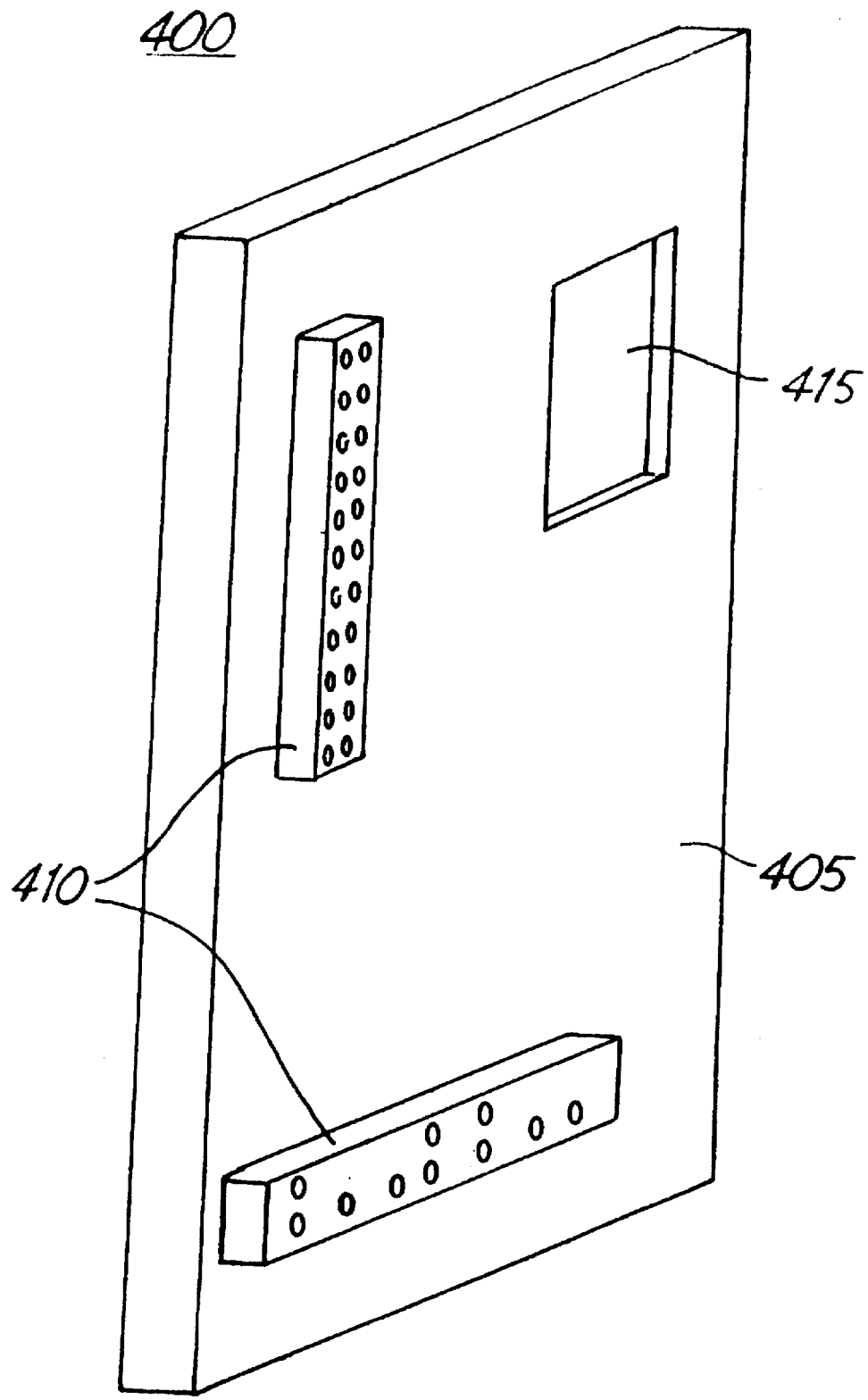
FIG. 4 illustrates a perspective view of the application specific interface back-plane, shown in FIG. 1.

FIG. 4 illustrates a perspective view of an exemplary application specific backplane, 400 such as the one utilized in FIG. 2. A planar substrate 405 provides the unique length, width and height dimensions required for a given system. Located on the substrate 405 are a pair of couplers 410 for connecting the sub-assembly and bus (not shown, see FIG. 1) to one another. Additionally, an aperture 415, is provided to allow for the direct coupling of a connector mounted on a given bus, that in turn couples to a sub-assembly. The modular fiber-optic assembly detailed in FIG. 2 provides one example of such a bus that may benefit from the permanent placement of connectors on the modular bus, while allowing for the interconnection of the fiber-optic portion of the subassembly, while simultaneously supporting couplers on the application specific backplane for economical connections, such as electrical. In this manner the application specific backplane may be tailored to either use additional couplers between a bus and a sub-assembly or allow for the combination of couplers for certain bus elements while accommodating permanent connectors on other bus devices.

Thus, the implementation of a reconfigurable backplane system utilizing application specific interface backplanes disposed between one or more bus structures and one or more sub-assemblies or modules, significantly reduces the cycle time for new designs of sub-assemblies or retrofitting with alternately configured sub-assemblies. The functional independence provided by the application specific interface backplane allows designers of individual subassemblies to proceed in parallel, and to various connectivity specifications without concern for the impact of system incompatibility. The application specific interface backplane can be as narrow as a single sub-assembly or can be several sub-assemblies in width. Alternative application specific interface backplane may be limited to one bus structure for ease in manufacturing of the application interface backplane, or if design demands dictate, can encompass a plurality of bus structures. Although described in terms of fiber-optic and electrical interfaces the teachings of the present invention would also work with other discretely connected buses, such as RF or high power interfaces.

While particular embodiments of the present invention have been shown and described, it should be clear that changes and modifications may be made to such embodiments without departing from the true scope and spirit of the invention. It is intended that the appended claims cover all such changes and modifications.

I claim:

1. A system for connecting two or more bus structures with two or more sub-assemblies within a given electronic device, comprising:
   a base member for mechanically supporting each bus structure and subassembly;
   a first structure utilizing fiber optic material, and providing an optical bus, wherein each connection to said first bus is of subjective and re-configurable placement along the base member;
   a second bus structure utilizing electrical conductive material, and providing an electrical bus, wherein each connection to said second bus is of subjective and re-configurable placement along the base member;
   a plurality of sub-assemblies, each having signal couplers of a given configuration that are complementary to at least one of said bus structures;
   a plurality of interface back-planes, wherein each backplane is configured with a given combination of connectors for mechanically, optically and electrically coupling sub-assemblies with the base member and at least one of the bus structures in such manner that complimentary couplers and apertures are located on each interface back-plane with respect to the site, shape and location of couplers and apertures on a respective sub-assembly, said sub-assembly to be coupled to a bus structure by an interface back-plane.

2. The system of claim 1, further comprising a third bus providing a radio frequency bus, wherein each connection to said third bus is a subjective and re-configurable placement along the base member.

3. The system of claim 1, further comprising at least three sub-assemblies and wherein a first application specific interface back-plane couples two sub-assemblies to the base member.

4. The system of claim 3, wherein the fiber optic bus structure is a modular fiber optic bus readily detachable from the base member and replaced with a fiber optic bus structure having couplers in permanent locations.

\* \* \* \* \*